| United States Patent [19] | [11] Patent Number: 4,933,776 |
| Ikeda | [45] Date of Patent: Jun. 12, 1990 |

[54] IMAGE PROCESSING METHOD AND APPARATUS THEREFOR

[75] Inventor: Yoshinori Ikeda, Matsudo, Japan

[73] Assignee: Canon Kabushiki Kaisha, Tokyo, Japan

[21] Appl. No.: 282,895

[22] Filed: Dec. 12, 1988

Related U.S. Application Data

[63] Continuation of Ser. No. 98,696, Sep. 18, 1987, which is a continuation of Ser. No. 570,812, Jan. 16, 1984, abandoned.

[30] Foreign Application Priority Data

Jan. 24, 1983 [JP] Japan ................................ 58-10096
Jan. 24, 1983 [JP] Japan ................................ 58-10098

[51] Int. Cl.$^5$ ............................................. H04N 1/38
[52] U.S. Cl. .................................... 358/456; 358/298; 358/457

[58] Field of Search ............... 358/280, 283, 448, 455, 358/456, 457, 461, 298, 300

[56] References Cited

U.S. PATENT DOCUMENTS

4,366,506 12/1982 Ejiri et al. .......................... 358/280

Primary Examiner—Edward L. Coles, Sr.
Attorney, Agent, or Firm—Fitzpatrick, Cella, Harper & Scinto

[57] ABSTRACT

A method of effective processing of image information with a limited memory capacity, by dividing elementary picture elements representing image information into unit pixels each containing at least two elementary pictire elements, counting the number of picture elements of a determined density level in each unit pixel and generating a density signal corresponding to the number of thus counted elementary picture elements.

8 Claims, 6 Drawing Sheets

IMAGE PROCESSING METHOD AND APPARATUS THEREFOR

This application is a continuation, of application Ser. No. 098,696 filed Sept. 18, 1987, which is a continuation of application Ser. No. 570,812 filed Jan. 16, 1984 now abandoned.

BACKGROUND OF THE INVENTION

1. Field of the Invention

The present invention relates to an iamge processing method for electrically processing image information and an apparatus therefor.

2. Description of the Prior Art

There are already known various apparatus for storing digital image data, obtained from a solid-state imaging device such as a charge-coupled device, a television camera or a scanner in a semiconductor memory, a magnetic disk or a magnetic tape, and reproducing the thus stored data in the form of dots or small picture elements by means of a laser beam printer, an ink jet printer, a thermal printer or the like.

Such conventional apparatus requires a memory of a very large capaciry for storing the image data, for example a capacity of 4072 kilobits for storing the data of an original image of A4 size (215×296 mm) with a resolving power of 8 lines/mm, or a capacity of 1.6 megabits for the same purpose with a resolving power of 16 lines/mm. Also for achieving high-speed data reading and printing, the memory has to be of a high-speed capability and has therefore to be made of a semiconductor memory. However the semiconductor memory, if used in such very high capacity, is inevitably expensive and becomes bulky in circuitry.

The reproduction of an intermediate tone from digital image data in such apparatus generally relies on a so-called dither method in which the image density is controlled by the change in the number of dots to be recorded in a unit area. However, such intermediate tone reproduction by the dither method inevitably involves distortion in the image edges or formation of moire patterns, and requires a complicated circuit involving a comparator and a memory for storing dither patterns.

SUMMARY OF THE INVENTION

In consideration of the foregoing, an object of the present invention is to provide an image processing apparatus capable of efficient processing of image information.

Another object of the present invention is to provide an image processing method, and an apparatus therefor, for effective transmission or storage of image information with a limited storage capacity.

Still another object of the present invention is to provide an image processing apparatus capable of satisfactory reproduction of intermediate tones.

Still another object of the present invention is to provide an image processing method, and an apparatus therefor, capable of efficient compression of image information.

The foregoing and still other objects of the present invention, and the effects thereof, will become fully apparent from the following description.

BRIEF DESCRIPTION OF THE DRAWINGS

FIG. 1, consisting of FIGS. 1(a)–1(d), is a schematic view showing the concept of density ranks;

FIG. 2, consisting of FIGS. 2A and 2B, is a circuit diagram for density ranking;

DETAILED DESCRIPTION OF THE PREFERRED EMBODIMENT

Now the present invention will be clarified in greater detail by the following description which is to be taken in conjunction with the attached drawings.

Figure 1A:
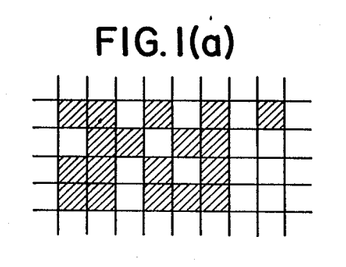
Figure 1B:
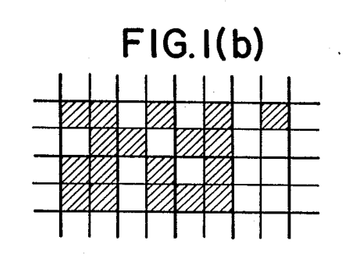
Figure 1C:
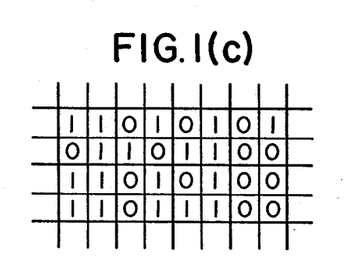
Figure 1D:
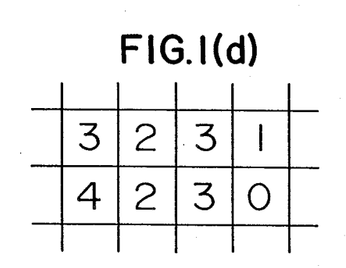

In FIG. 1(a) illustrates a part of elementary picture elements, representing black or white level, obtained by reading an original image with a linear image sensor such as a charge-coupled device, with a resolving power of 8 lines/mm, and said elementary picture elements are divided into pixels as shown in FIG. 1(b), each of which consists of 2×2 elementary picture elements. In four elementary picture elements constituting each pixel, the number of picture elements, of for example, black level is counted and the obtained count is given, as a density rank, to said pixel, and stored in a memory means as image information for each pixel. More specifically, the black-level image signal being taken as "1", the information of the elementary picture elements shown in FIG. 1(a) is binarily digitized as shown in FIG. 1(c). The digital values are added for each pixel as shown in FIG. 1(d), and the added values are stored as the density ranks.

In this manner each pixel, composed of 2×2 elementary picture elements is represented by a rank number from "0" to "4" or by a 3-bit binary digital number. Consequently the memory capacity can be reduced to $\frac{3}{4}$, in comparison with the conventional memory method in which one bit is allotted to each picture element or four bits are allotted to every four picture elements.

Figures 2, 2B:
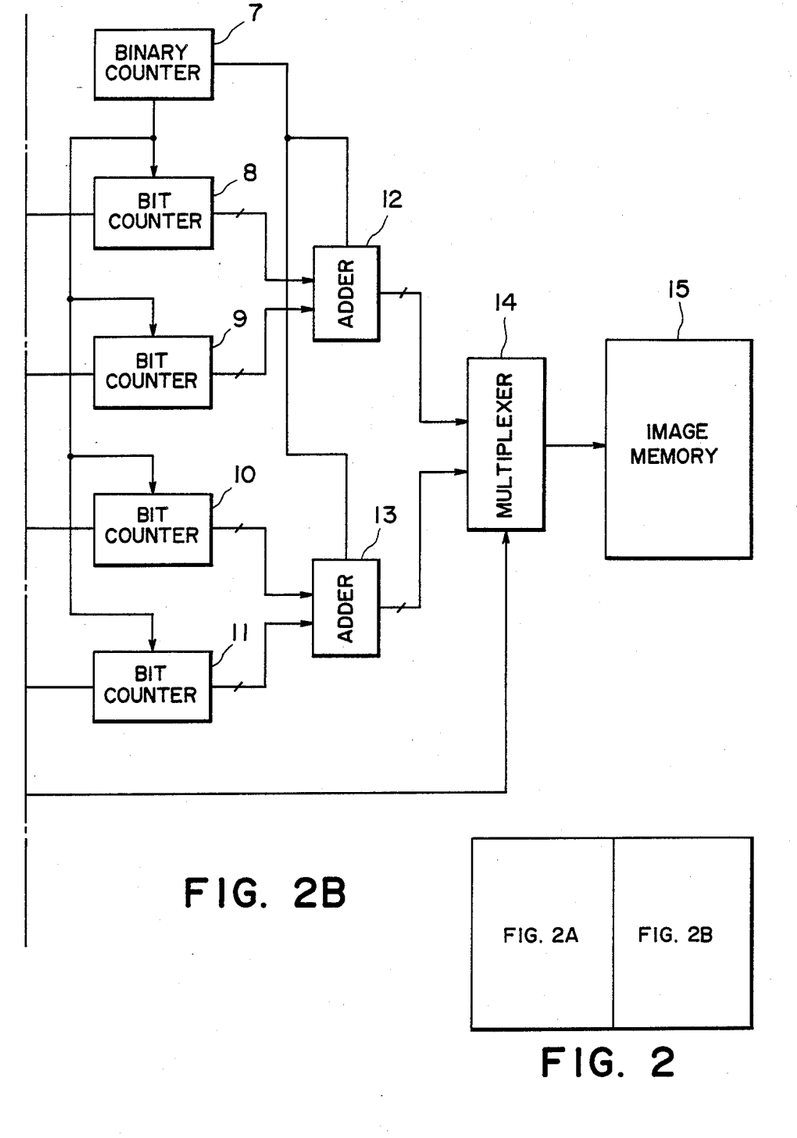
Figure 2A:
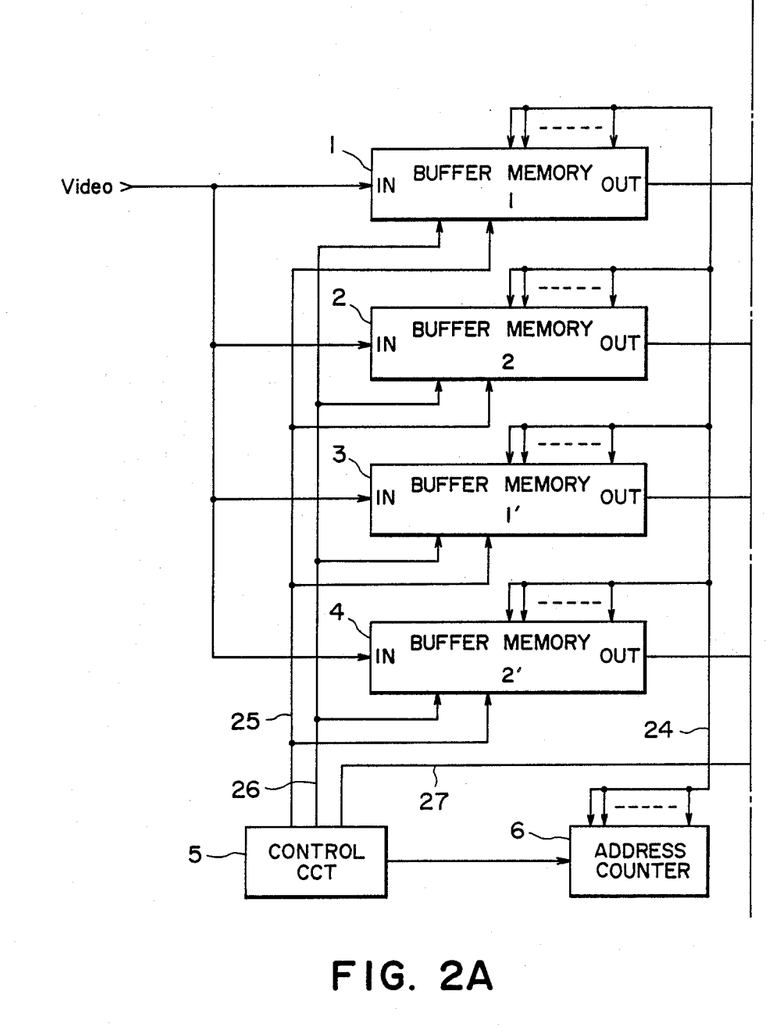

FIG. 2 shows an example of circuit structure for carrying out the present invention.

Binary video signals serially released in the unit of a scanning line from an output device equipped with imaging means such as a charge-coupled device are time-sequentially stored in succession, in the unit of a scanning line, in four buffer memories 1, 2, 3 and 4 each of a capacity of at least a scanning line. Said buffer memories are grouped as 1, 2 and 3, 4 and alternately activated for signal reading and writing in such a manner that the video signals are read from the buffer memories 3, 4 while the video signals are written into the buffer memories 1, 2. A memory read signal 25 and a memory write signal 26 for switching said signal reading and writing are released from a control circuit 5 in synchronization with the video signals. An address counter 6 generates address signals 24 for storing the video signals representing elementary picture element signals.

The video signals are stored, in the unit of a scanning line, into the buffer memories in the successive order of 1, 2, 3 and 4, but the signal read-out is conducted simultaneously for two scanning lines for a set of buffer memories 1, 2 or 3, 4. For example during the signal write-in to the buffer memories 3, 4, the signals are simultaneously read from the buffer memories 1, 2. A binary counter 7 divides the video signals, read from the buffer memories, into the sets of two bits each, while bit counters 8, 9 count the number of signals "1" representing the black picture elements on respective lines and provide 2-bit signals, which are added in an adder 12 to supply a 3-bit density rank number to a multiplexer 14. On the other hand, during the video signal storage in the buffer memories 1, 2, the video signals are similarly read from the buffer memories 3, 4. In this manner the adder 12 or 13 releases a 3-bit density rank number representing the number of black-level elementary picture elements in the 2×2 elementary picture elements. The multiplexer 14 alternately selects the adders 12, 13 for every two lines of the original video signals, or every line of an image memory 15, in response to the selecting signal 27 supplied from the control circuit 5, whereby the image memory stores the image information as shown in FIG. 1(d).

Figure 3:
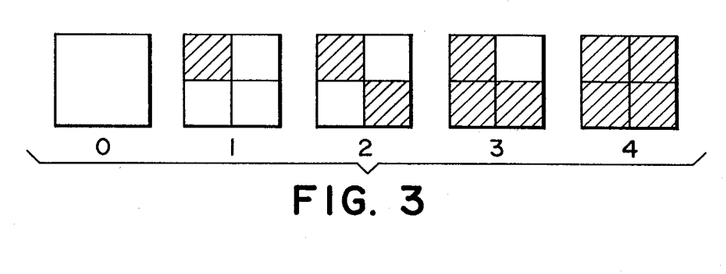
FIG. 3 is a schematic view showing examples of reproduced patterns.

The density ranks "0"–"4" thus stored are respectively correlated with different unit pixel patterns with varying number of black elementary picture elements as shown in FIG. 3, and the original image can be reproduced by accordingly regulating the image density for example by the number of dots per unit area. According to the present embodiment, the number of black or white elementary picture elements in each unit pixel composed of 2×2 elementary picture elements remains unchanged, and each pixel is as small as 0.25 mm$^2$ or 0.125 mm$^2$ for a resolving power of 8 or 16 lines/mm, respectively, so that the reproduced image is visually not distinguishable from the original image.

In the present embodiment the memory capacity is reduced to ¼ of that in the conventional method by selecting 2×2 elementary picture elements as a unit pixel, but it is also possible to store an image without change with a memory capacity reduced to less than half, or more exactly to 4/9, by selecting 3×3 elementary picture elements as a unit pixel. In this manner the effect of the present invention will naturally become more marked as the number of elementary picture elements constituting the unit pixel increases.

Also it will be easily understandable that a similar effect can be obtained with a unit pixel of other shapes than a square of n×n picture elements, and it is naturally possible to effect the counting of picture elements and the conversion to the density levels through appropriate software for a microcomputer.

In the foregoing embodiment the number of black picture elements in a unit pixel is counted, but it is also possible to count and store the number of white picture elements. Also the number of picture elements need not necessarily be stored directly but may be stored in the form of a suitable corresponding signal. The present invention is furthermore effective for the transmission of image information since the quantity of information can be efficiently compressed.

As explained in the foregoing, the present invention, enabling to store the image information with memory means of a limited memory capacity, is advantageous in terms of cost and structure.

In the foregoing description the recording is achieved by regulating the proportion of black image in the unit pixel according to the density level of each unit pixel stored in the image memory 15. In the following there will be explained another recording method in which the density itself of the recorded dot is regulated according to said density level.

Figure 4:
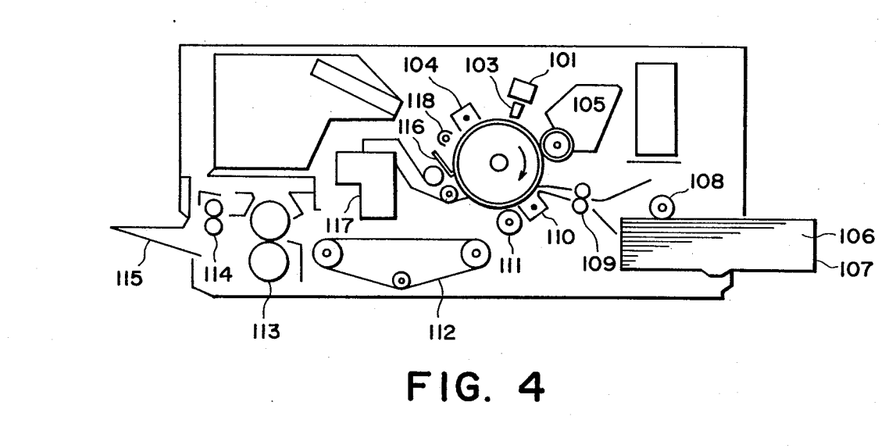
FIG. 4 is a schematic cross-sectional view showing a light-emitting diode printer.

FIG. 4 shows the structure of a light-emitting diode printer representing an example of the image recording apparatus, wherein a light-emitting diode printing head provided with 4096 light-emitting diodes is activated in response to the aforementioned density level signals. There also shown are a rotary drum 102 provided with a photosensitive member along the periphery thereof; a rod lens array 103 for focusing the light from the light-emitting diodes of the printing head 101 onto the photosensitive surface of the drum 102; a corona charger 104 for charging the photo-sensitive surface in advance; a developing station 105 for developing an electrostatic latent image with toner; recording sheets 106; a cassette 107 containing a plurality of said recording sheets 106; a feeding roller 108 for feeding a recording sheet 106 from said cassette 107; registration roller 109 for matching the front end of the recording sheet with that of the image on the drum 102; a transfer charger 110 for transferring the developed image on the drum 102 onto the recording sheet; a separating roller 111 for separating the recording sheet from the drum 102; a belt 112 for conveying the recording sheet; fixing rollers 113; discharge rollers 114 for discharging the recording sheet onto a tray 115; a blade cleaner 116 for removing the toner remaining on the drum 102; a container 117 for removed toner; and lamp 118 for eliminating the charge remaining on the drum 102.

In the following there will be given an explanation on the function of the above-described printer. Upon the turning on of an unrepresented main switch, a motor is activated to rotate the drum 102, and the lamp 118 and the corona charger 104 are turned on, thereby removing the toner and charge remaining on the drum and erasing the hysteresis thereon. When the fixing rollers 113 reaches an image fixing temperature by means of an internal heater, there is released a recording enable signal.

Then, in response to the density level signals supplied from the aforementioned image memory 15, the light-emitting diodes of the printing head 101 are dynamically activated, and the emitted light is projected through the rod lens array 103 onto the drum 102. The charge formed by the charger 104 on the drum 102 is selectively eliminated in an exposure station by the light from the printing head 101, thereby forming an electrostatic latent image on the drum. Said latent image is rendered visible by toner deposition in the developing station 105. The visible image thus obtained is transferred, in a transfer station, onto the recording sheet by means of the transfer charger 110. The recording sheets are fed one by one from the cassette 107 by means of the timed function of the feeding roller 103, and each sheet passes through said transfer station with a speed the same as the peripheral speed of the drum, by means of the registration roller 109.

The recording sheet after image transfer is separated by the separating roller 111, then advanced by the belt 112 to the fixing rollers 113 for image fixing, and finally discharged onto the tray 115 by the rollers 114. The drum after said image transfer continues to rotate and is subjected to toner removal with the blade cleaner 116 and hysteresis erasure with the lamp 118.

Figure 5:
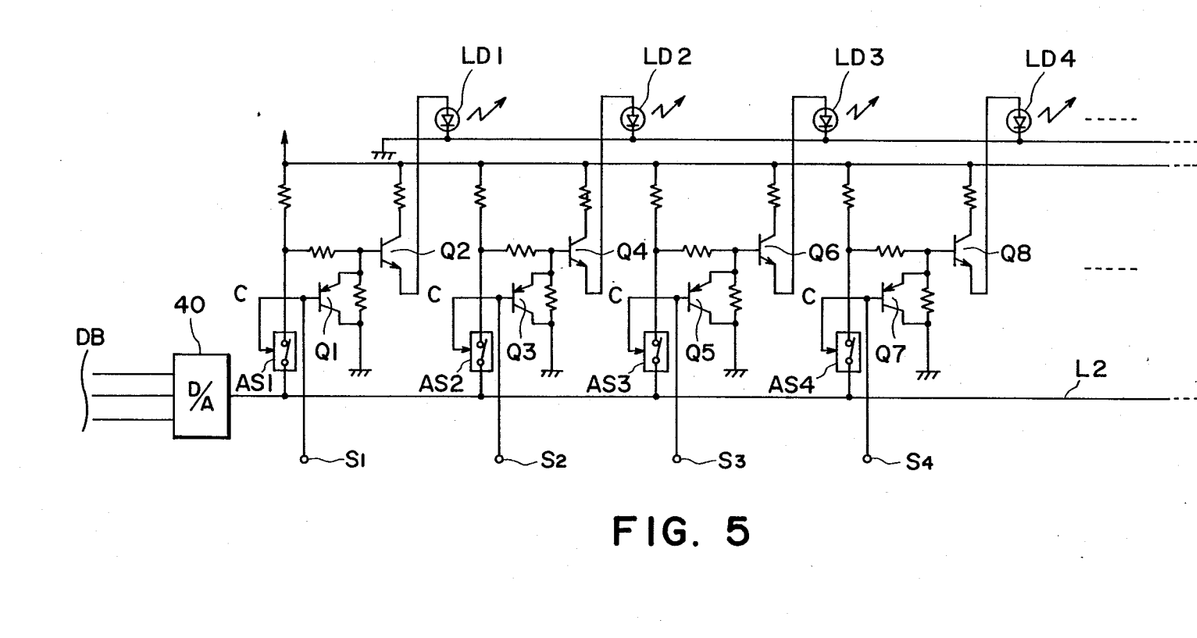
FIG. 5 is a circuit diagram showing an example of a light-emitting diode printer.
Figure 6:
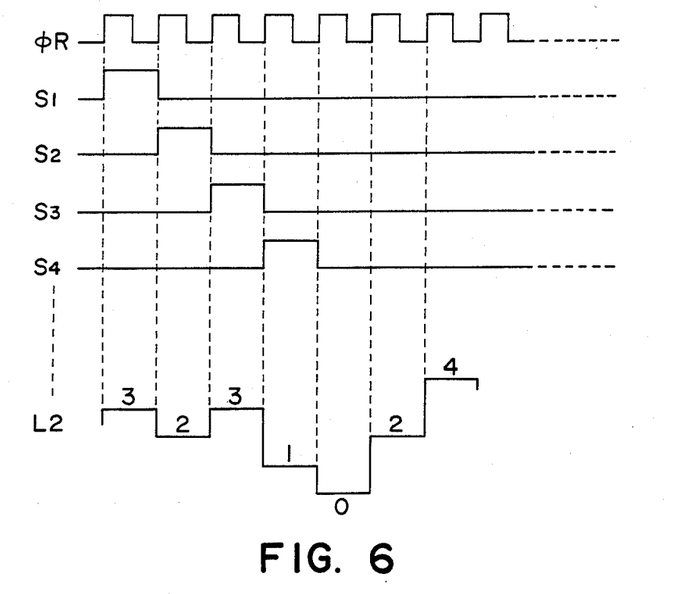
FIG. 6 is a timing chart showing various signals.

FIG. 5 shows a circuit for driving and intensity modulating a light-emitting diode array having a linear array of light-emitting diodes and functioning as an output device for image recording with the printer shown in FIG. 4, in response to the image information supplied from the image memory 15 shown in FIG. 2. The image information stored in the form shown in FIG. 1(d) is read from the memory 15, 3 bits at a time in parallel form, in synchronization with memory read-out clock pulses φR, and supplied through a data bus DB to a digital-to-analog converter 40, which supplies a voltage to a line L2 corresponding to the density rank of the unit pixel, as shown in FIG. 6. In FIG. 6, a curve L2 shows the change in voltage when the density rank varies in a sequence 3, 2, 3, 1, 0, 2 and 4. Light-emitting diode selecting pulses S1, S2, S3, ... actuate the analog switches AS1, AS2, ... in succession for respective unit pixels in synchronization with the memory read-out clock pulses φR, thereby dynamically lighting the lightemitting diodes LD1, LD2, ....

The intensity modulation of the light-emitting diodes is conducted in the following manner. Let us consider a state in which the signal S1 turns on the analog switch AS1 to select the light-emitting diode LD1. In this situation, a transistor Q1 is turned off because of the level "1" state of the signal S1. On the other hand, a transistor Q2 is given a base bias corresponding to the output voltage of the digital-to-analog converter 40 released to the line L2 in response to the 3-bit image density data on the data bus DB, whereby the current flowing in the light-emitting diode LD1 is accordingly controlled. Subsequently the light-emitting diodes LD2, LD3, ... are controlled dynamically in a similar manner. When data "0, 0, 0" are given to the data bus DB, the D/A converter 40 releases a zero output voltage, whereby emitter current in the transistor Q2 is reduced almost to zero and the light-emitting diode LD1 is extinguished.

Figure 7:
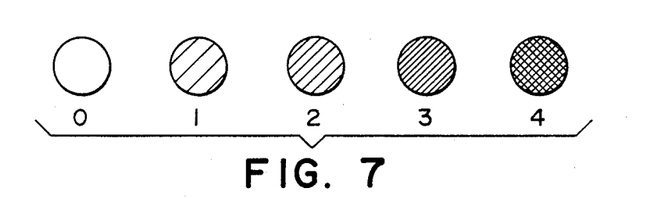
FIG. 7 is a schematic view showing examples of recorded dots with different density levels.

FIG. 7 shows different states of the dot in each unit pixel obtained by exposure with the light emitting diode in the above-explained manner. The intensity of each light-emitting diode varies according to the data (0-4) on the data bus DB whereby the image density is regulated by the change in the exposure. When the light-emitting diode LD1 is not selected, the signal S1 is in a state "0" to turn on the transistor Q1, whereby the base of the transistor Q2 is reduced to zero potential so that the light-emitting diode LD1 is not lighted. In the present embodiment the data bus DB has a capacity of 3 bits for enabling control of 5 levels, but a more delicate intensity is naturally possible if the capacity of the data bus is increased.

Although the foregoing description is limited to an electrostatic recording method utilizing light-emitting diodes, the present invention is naturally applicable also to the intensity modulation in a laser beam printer for dot recording with a laser beam, or to the ink droplet control in an ink jet printer for recording by ink droplet deposition. Also the signals representing the density ranks may be directly supplied to the printer without the use of memory.

As explained in the foregoing, the present invention enables one to reproduce image density, particularly intermediate tones, with a simple structure.

What I claim is:

1. An image processing apparatus comprising:
    entering means for entering plural image signals representing the density of elementary picture elements;
    detecting means for detecting the number of image signals of a predetermined density in a unit area including at least two elementary picture elements;
    generating means for generating, in series, digital density signals, each of the digital density signals representing the detected number of the image signals for the unit area;
    converting means for converting the digital density signals generated in series by said generating means into analog density signals and outputting the analog signals in series;
    forming means for forming, for each unit area, a dot of variable density on a photosensitive member, said forming means comprising a plurality of lightemitting elements each of which is subjected to intensity modulation in response to electric power provided thereto;
    a plurality of providing means, each for providing electric power, in an amount corresponding to an associated one of the analog density signals, to an associated one of said plurality of light-emitting elements; and
    distributing means for sequentially distributing the analog density signals in series outputted from said converting means to said plurality of providing means.

2. An image processing apparatus according to claim 1, further comprising means for storing plural lines of the image signals entered by said entering means.

3. An image processing apparatus according to claim 1, wherein said detecting means comprises means for counting the number of image signals of a determined density per unit area.

4. An image processing apparatus according to claim 1, wherein said detecting means is adapted the count the number of image signals of a density corresponding to white or black level.

5. An image processing apparatus according to claim 1, wherein said generating means is adapted to generate a binary number indicating the detected number of image signals.

6. An image processing apparatus according to claim 1, wherein said forming means is adapted to form a dot per said unit area.

7. An image processing apparatus according to claim 1, further comprising means for dividing the image signals entered from said entering means into the image signals corresponding to the picture elements constituting said unit area.

8. An image processing apparatus according to claim 1, wherein said entering means is adapted to enter image signals obtained from reading an image by means of an image sensor.

* * * * *

UNITED STATES PATENT AND TRADEMARK OFFICE
CERTIFICATE OF CORRECTION

PATENT NO. : 4,933,776

DATED : June 12, 1990

INVENTOR(S) : YOSHINORI IKEDA

It is certified that error appears in the above-identified patent and that said Letters Patent is hereby corrected as shown below:

IN [57] ABSTRACT

Line 5, "pictire" should read --picture--.

COLUMN 1

Line 12, "iamge" should read --image--.

COLUMN 2

Line 18, "In" should be deleted.
    Line 26, "elements, of" should read --elements of,--.
    Line 37, "elements" should read --elements,--.

COLUMN 4

Line 6, "There also shown are" should read
        --There are also shown--.
    Line 35, "reaches" should read --reach--.

COLUMN 5

Line 14, "lightemitting" should read --light-emitting--.
    Line 34, "light emitting" should read
        --light-emitting--.

UNITED STATES PATENT AND TRADEMARK OFFICE
CERTIFICATE OF CORRECTION

PATENT NO. : 4,933,776
DATED : June 12, 1990
INVENTOR(S) : YOSHINORI IKEDA

It is certified that error appears in the above-identified patent and that said Letters Patent is hereby corrected as shown below:

COLUMN 6

Line 20, "lightemitting elements" should read
--light-emitting elements--.
Line 40, "the count" should read --to count--.

Signed and Sealed this

Third Day of September, 1991

Attest:

HARRY F. MANBECK, JR.

Attesting Officer

Commissioner of Patents and Trademarks